United States Patent [19]

McLean et al.

[11] Patent Number: 4,791,269

[45] Date of Patent: Dec. 13, 1988

[54] METHOD OF FABRICATING A SPLINE DRIVE

[75] Inventors: James N. McLean; Bruce A. McLean, both of Tonawanda, N.Y.

[73] Assignee: Herr Manufacturing Company, Inc., Tonawanda, N.Y.

[21] Appl. No.: 46,516

[22] Filed: May 6, 1987

[51] Int. Cl.$^4$ .............................................. B23K 26/00
[52] U.S. Cl. ............................... 219/121.64; 29/159.2; 29/159.3; 29/437; 228/135
[58] Field of Search ............... 219/121 LC, 121 LD; 29/437, 159.2, 159.3, DIG. 47; 228/135

[56] References Cited

U.S. PATENT DOCUMENTS

| | | | |
|---|---|---|---|
| 4,353,705 | 10/1982 | Scott-Jackson et al. | 29/159.2 X |
| 4,633,556 | 1/1987 | Santi | 29/159.2 |
| 4,741,191 | 5/1988 | Anderson et al. | 29/159.2 X |

FOREIGN PATENT DOCUMENTS

| | | | |
|---|---|---|---|
| 1308364 | 9/1962 | France | 29/159.3 |
| 180621 | 9/1962 | Sweden | 29/159.3 |

Primary Examiner—C. L. Albritton
Attorney, Agent, or Firm—Joseph P. Gastel

[57] ABSTRACT

A method of fabricating a spline drive including the steps of providing an elongated rod of indeterminate length having axially extending splines thereon, cutting a cylindrical member of predetermined length from the elongated rod, turning the cylindrical member at its end to provide splines of reduced height and shoulders at the junctions of the reduced splines and the original splines, broaching a washer to provide an internal surface of complementary mating relationship to the turned end of the cylindrical member, mounting the washer on the turned end with the side of the washer abutting the shoulders, laser-welding the washer to the cylindrical member, and brazing a drum to the washer.

20 Claims, 2 Drawing Sheets

METHOD OF FABRICATING A SPLINE DRIVE

BACKGROUND OF THE INVENTION

The present invention relates to an improved method of fabricating a spline drive.

By way of background, spline drives are used for various parts and they usually consist of a splined member which is bonded to a drum. In the past the splined member was either a casting or a sintered metal part, each of which required a substantial die cost. In addition, different costly dies were required for different lengths of splined members.

SUMMARY OF THE INVENTION

The present invention relates to an improved method of fabricating a spline drive in an unique manner at a relatively low cost.

Another object of the present invention is to provide an improved method of fabricating spline drives of different lengths in an extremely simple manner. Other objects and attendant advantages of the present invention will readily be perceived hereafter.

The present invention relates to a method of fabricating a spline drive comprising the steps of providing a cylindrical member with axially extending splines of a first depth thereon, reducing the height of said splines at one end of said member to provide second splines of a second depth which is less than said first depth and simultaneously provide shoulders at the ends of said first splines at the junctions of said first and second splines, providing a washer with an internal surface thereon of complementary mating relationship to fit onto said one end of said member, mounting said washer on said one end of said member in abutting relationship with said shoulders to thereby locate said washer in a proper position on said member, and securing said washer to said member in said proper position. The present method also includes the step of providing a drum with an aperture therein, inserting said cylindrical splined member through said aperture, and securing said washer to said drum. The present method also includes the step of cutting said cylindrical splined member to a predetermined length from a rod of indeterminate length.

The various aspects of the present invention will be more fully understood when the following portions of the specification are read in conjunction with the accompanying drawings wherein:

DESCRIPTION OF THE PREFERRED EMBODIMENTS

Figure 4:
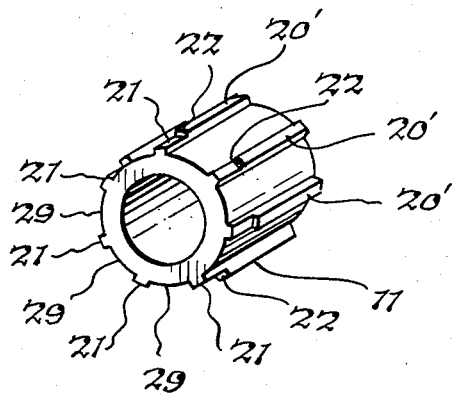
FIG. 4 is a perspective view of the cylindrical splined member of FIG. 3 after the splines at one end have been turned down to a smaller height.
Figure 6:
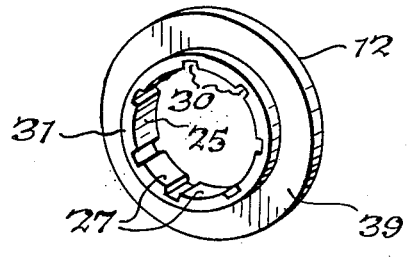
FIG. 6 is a perspective view of the washer of FIG. 5 after it has been broached to have an internal surface of complementary mating shape to the outer surface of the end of the cylindrical splined member which has been turned down as shown in FIG. 4.
Figure 8:
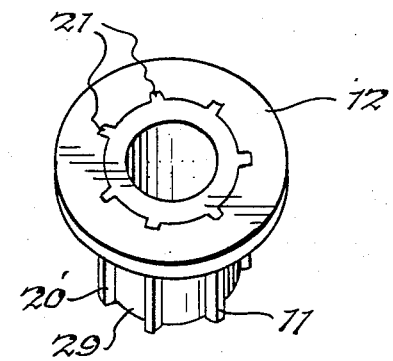
FIG. 8 is an exploded view showing the assembled part of FIG. 7, a copper brazing washer, and a drum into which the other two parts are assembled.
Figure 10:
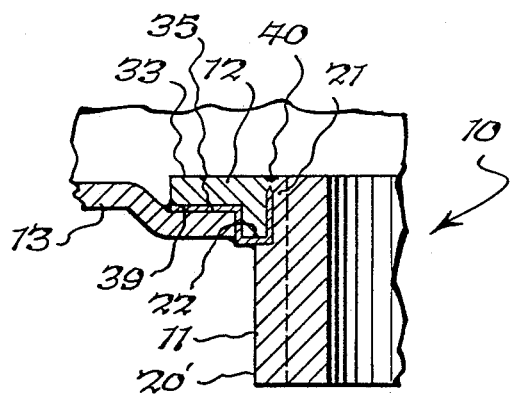
FIG. 10 is an enlarged fragmentary cross sectional view of a portion of FIG. 9 and showing the brazing material after it has flowed into the joints between the drum and the assembled parts of FIG. 7.

The improved method of the present invention is for the purpose of fabricating a spline drive 10 of the type fragmentarily shown in FIG. 10. The spline drive 10 comprises a suitably machined splined member 11 (FIG. 4) having a washer 12 (FIG. 6) suitably secured thereto and a drum 13 (FIG. 8) also suitably secured to the washer 12.

The improved method of fabricating spline drive 10 includes the first step of providing an elongated solid splined rod 14 of indeterminate length or an elongated hollow splined rod 15 of indeterminate length and thereafter cutting a cylindrical splined member 17 of predetermined length from rod 15 or cutting and boring member 17 of predetermined length from solid rod 14. Rods 14 and 15 can each be formed from any suitable material, such as steel, by extrusion, or in any other suitable manner. Rods 14 and 15 each have axially extending splines 19 thereon and these splines in a shortened form appear as splines 20 on member 17.

Figure 3:
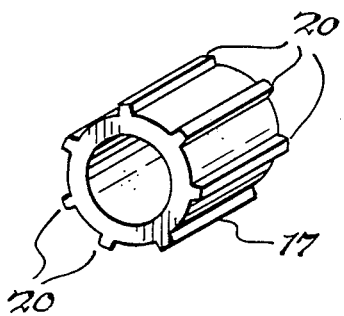
FIG. 3 is a perspective view of a cylindrical splined member of predetermined length which has been cut from the rod of FIG. 2.

The next step in the process is to machine member 17 (FIG. 3) into member 11 (FIG. 4) by suitably machining the elongated splines 20 so that the ends thereof are formed into splined portions 21 having a height which is less than the height of the remaining portions 20' of splines 20. The machining is preferably done by turning but it can be done by any other suitable process. As a result of reducing the height of the splines at one end of member 11, shoulders 22 are formed at each junction of splines 21 and 20'.

Figure 1:
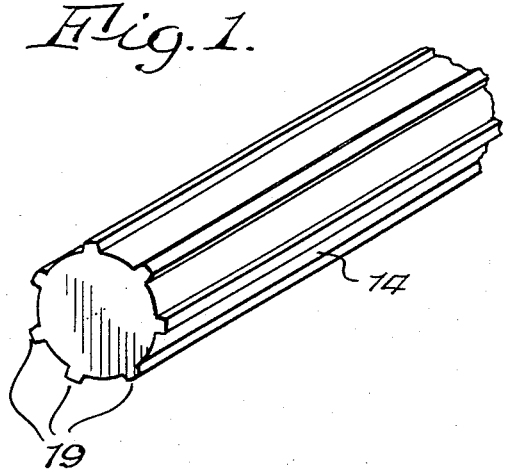
FIG. 1 is a fragmentary perspective view of an extruded solid splined rod of indeterminate length from which splined members of predetermined length can be cut.
Figure 2:
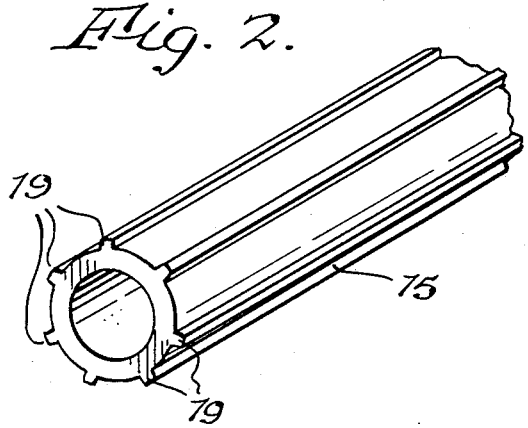
FIG. 2 is a fragmentary perspective view of air extruded hollow splined rod of indeterminate length from which splined members of predetermined length can be cut.

The advantage of fabricating cylindrical splined member 11 in the foregoing manner is that the operation can be effected on an automatic screw machine from stock such as shown in FIGS. 1 and 2, and further member 11 can have any desired length. This is mcuh more economical than fabricating a part 11 by casting or sintering because the high cost of the dies is eliminated, especially considering that different dies are required for different lengths.

Figure 7:
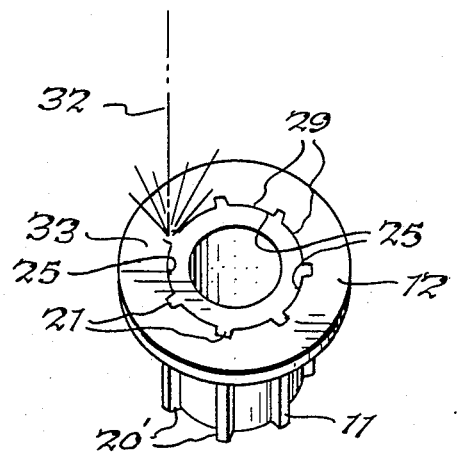
FIG. 7 is a perspective view, partly schematic, showing the broached washer of FIG. 6 assembled on the turned down end of the splined cylindrical member and also showing the parts being laser-welded together.

The next step in the process of providing a spline drive 10 is to provide a washer 23 having an enlarged shoulder portion 24 and thereafter forming washer 12 of FIG. 10 by suitably machining the internal surface 25 so that it is of complementary mating relationship to the end of member 11 which has reduced height splines 21 thereon. The preferred way of forming internal surface 25 is by broaching. Surfaces 27 of internal surface 25 fit closely on surfaces 29 of member 11 and grooves 30 of member 12 fit closely on reduced height splines 21. In addition, the edge 31 of shoulder portion 24 fits up against shoulders 22 to thereby locate washer 12 on the end of member 11. The assembled parts 11 and 12 are shown in FIG. 7.

After parts 11 and 12 have been assembled with shoulder 24 in abutting relationship with shoulders 22, members 11 and 12 are secured together. The preferred way is by laser-welding, with the laser beam 32 being schematically shown in FIG. 7. The laser-welding is effected on the side of surface 33 of washer 12, and it may be performed at the entire joint between the parts, which includes splines 21 and grooves 30, or the laser-welding may just be effected between surfaces 25 and 29. The laser-welding will penetrate about 1/32 of an inch into the joint of surface 33, which is sufficient to provide a good bond. The entire axial length of contact between members 11 and 12 is approximatley ⅛ of an inch. If desired, other techniques can be utilized to secure splined member 11 and washer 12. Such techniques may include swaging, knurling and pressing, or any other desired method.

Figure 5:
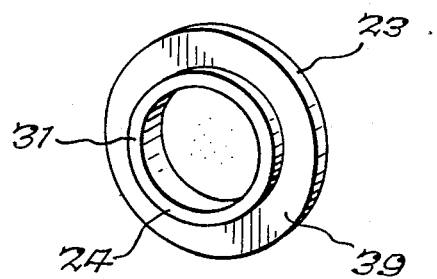
FIG. 5 is a perspective view of a washer which is used as part of the splined drive before it has been suitably machined.
Figure 9:
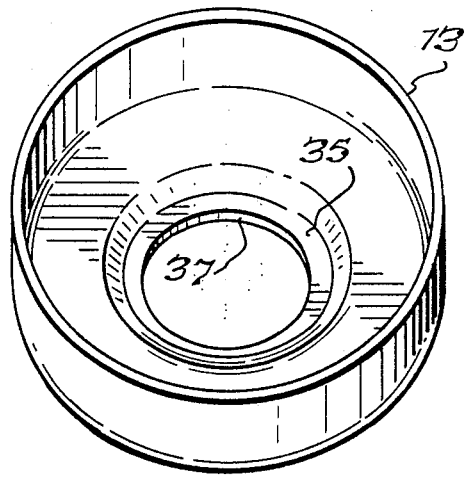
FIG. 9 is a fragmentary cross sectional view taken through the center of the assembled unit of FIG. 8 and showing the copper brazing washer in assembled relationship to the other two parts.
Figure 9:
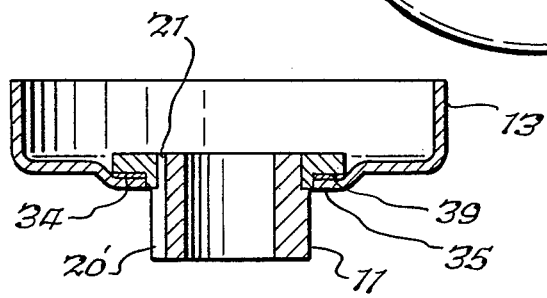

The next step in the process of fabricating spline drive 10 is to secure drum 13 to assembled members 11 and 12. This is preferably achieved by brazing. In this respect, a washer 34 (FIG. 8) of brazing material is provided and is placed on shelf 35 of drum 13. The end of splined member 11 having splines 20' thereon is inserted through aperture 37 in drum 13 until surface 39 (FIG. 5) of washer 23 comes to rest on brazing washer 34, which may be of any suitable brazing material which is commonly used for copper brazing. Thereafter, suitable heat and pressure is applied to the assembly of FIG. 9 and the brazing washer 34 will melt and fill the joint between surfaces 39 and 35, the joint between shoulders 22 and washer portion 24, and the joint between the entire internal surface 25 and surfaces 29 at the end of splined member 11. The brazing will provide an extemely solid connection between the three parts, in addition to the bond provided by the previous laser-welding between members 11 and 12, this portion being designated by numeral 40 in FIG. 10. Other ways of attaching washer 12 to drum 13 may be by riveting or welding, or by any other suitable form of attachment.

The above described relationship of shoulders 22 and shoulder 24 should ordinarily cause the remainder of washer 12 to be perfectly square relative to member 11. However, if for any reason it is not, the face 39 (FIG. 5) of washer 12 can be machined so that it extends perfectly perpendicularly to the longitudinal axis of member 11, and thus the axis of drum 13 will be aligned with the axis of member 11 after they have been joined, as described above.

It can thus be seen that the improved method of the present invention is manifestly capable of providing an economical spline drive, and while preferred embodiments of the present invention have been disclosed, it will be appreciated that it is not limited thereto but may be otherwise embodied within the scope of the following claims.

What is claimed is:

1. A method of fabricating a spline drive comprising the steps of providing a cylindrical member with axially extending first splines of a first depth thereon, reducing the height of said first splines at one end of said member to provide second splines of a second depth which is less than said first depth and simultaneously provide shoulders at the ends of said first splines at the junctions of said first and second splines, providing a washer with an internal surface thereon of complementary mating relationship to fit onto said one end of said member, mounting said washer on said one end of said member in abutting relationship with said shoulders to thereby locate said washer in a proper position on said member, and securing said washer to said member in said proper position.

2. A method of fabricating a spline drive as set forth in claim 1 including the step of boring a cylindrical hole in said member.

3. A method of fabricating a spline drive as set forth in claim 1 wherein said step of providing a washer with an internal surface of complementary mating relationship includes the step of broaching said internal surface.

4. A method of fabricating a spline drive as set forth in claim 1 wherein said step of reducing the height of said first splines comprises turning down said first splines at said one end.

5. A method of fabricating a spline drive as set forth in claim 1 wherein said step of providing said cylindrical member comprises the steps of providing an elongated member of indeterminate length and cutting said cylindrical member to a predetermined length from said cylindrical member.

6. A method of fabricating a spline drive as set forth in claim 1 wherein said step of securing said washer to said member includes the step of laser welding.

7. A method of fabricating a spline drive as set forth in claim 1 wherein said step of providing a washer with an internal surface of complementary mating relationship includes the step of broaching said internal surface, and wherein said step of reducing the height of said first splines comprises turning down said first splines at said one end.

8. A method of fabricating a spline drive as set forth in claim 1 wherein said step of providing a washer with an internal surface of complementary mating relationship includes the step of broaching said internal surface, and wherein said step of providing said cylindrical member comprises the steps of providing an elongated member of indeterminate length and cutting said cylindrical member to a predetermined length from said cylindrical member.

9. A method of fabricating a spline drive as set forth in claim 1 wherein said step of providing a washer with an internal surface of complementary mating relationship includes the step of broaching said internal surface, and wherein said step of securing said washer to said member includes the step of laser welding.

10. A method of fabricating a spline drive as set forth in claim 1 wherein said step of providing a washer with an internal surface of complementary mating relationship includes the step broaching said internal surface, and wherein said step of reducing the height of said first splines comprises turning down said first splines at said one end, and wherein said step of providing said cylindrical member comprises the steps of providing an elongated member of indeterminate length and cutting said cylindrical member to a predetermined length from said cylindrical member.

11. A method of fabricating a spline drive as set forth in claim 1 wherein said step of providing a washer with an internal surface of complementary mating relationship includes the step of broaching said internal surface, and wherein said step of reducing the height of said first splines comprises turning down said first splines at said one end, and wherein said step of securing said washer to said member includes the step of laser welding.

12. A method of fabricating a spline drive as set forth in claim 1 wherein said step of providing a washer with an internal surface of complementary mating relationship includes the step of broaching said internal surface, and wherein said step of providing said cylindrical member comprises the steps of providing an elongated member of indeterminate length and cutting said cylindrical member to a predetermined length from said cylindrical member, and wherein said step of securing said washer to said member includes the step of laser welding.

13. A method of fabricating a spline drive as set forth in claim 1 wherein said step of providing a washer with an internal surface of complementary mating relationship includes the step of broaching said internal surface, and wherein said step of reducing the height of said first splines comprises turning down said first splines at said one end, and wherein said step of providing said cylindrical member comprises the steps of providing an elongated member of indeterminate length and cutting said cylindrical member to a predetermined length from said cylindrical member, and wherein said step of securing said washer to said member includes the step of laser welding.

14. A method of fabricating a spline drive as set forth in claim 1 wherein said step of reducing the height of said first splines comprises turning down said first splines at said one end, and wherein said step of providing said cylindrical member comprises the steps of providing an elongated member of indeterminate length and cutting said cylindrical member to a predetermined length from said cylindrical member.

15. A method of fabricating a spline drive as set forth in claim 1 wherein said step of reducing the height of said first splines comprises turning down said first splines at said one end, and wherein said step of providing said cylindrical member comprises the steps of providing an elongated member of indeterminate length and cutting said cylindrical member to a predetermined length from said cylindrical member, and wherein said step of securing said washer to said member includes the step of laser welding.

16. A method of fabricating a spline drive as set forth in claim 1 wherein said step of providing said cylindrical member comprises the steps of providing an elongated member of indeterminate length and cutting said cylindrical member to a predetermined length from said cylindrical member, and wherein said step of securing said washer to said member includes the step of laser welding.

17. A method of fabricating a spline drive as set forth in claim 1 wherein said step of reducing the height of said first splines comprises turning down said first splines at said one end, and wherein said step of securing said washer to said member includes the step of laser welding.

18. A method of fabricating a spline drive as set forth in any of claims 1 through 17 including the step of providing a drum with an aperture therein, inserting said cylindrical splined member through said aperture, and securing said washer to said drum.

19. A method of fabricating a spline drive as set forth in any of claims 1 through 17 including the step of providing a drum with an aperture therein, inserting said cylindrical splined member through said aperture, said step of securing said washer to said drum comprising positioning brazing material between said washer and said drum, and causing said brazing material to flow into the joints between said drum and said washer and said splined member.

20. A method of fabricating a spline drive as set forth in claim 1 wherein said washer has a face facing said first splines, and turning said face after said washer has been secured to said member to thereby square said face relative to said member, providing a drum with an aperture therein, inserting said cylindrical splined member through said aperture, and securing said washer to said drum with said turned face in engagement with said drum.

* * * * *

UNITED STATES PATENT AND TRADEMARK OFFICE
CERTIFICATE OF CORRECTION

PATENT NO. : 4,791,269

DATED : December 13, 1988

INVENTOR(S) : James N. McLean et al

It is certified that error appears in the above-identified patent and that said Letters Patent is hereby corrected as shown below:

Column 2, line 60, change "mcuh" to --much--.

Column 4, line 59 (claim 10), after "step" insert --of--.

Signed and Sealed this

Fourth Day of April, 1989

*Attest:*

DONALD J. QUIGG

*Attesting Officer*

*Commissioner of Patents and Trademarks*